Aug. 25, 1970   SHINICHIRO OGAWA ET AL   3,525,920
DEVICE TO MULTIPLY INPUT CURRENT BY TIME RATIO
Filed Sept. 23, 1968

INVENTORS.
SHINICHIRO OGAWA
TOSHIYUKI MATSUDA
BY
ATTORNEY

United States Patent Office 3,525,920
Patented Aug. 25, 1970

3,525,920
DEVICE TO MULTIPLY INPUT CURRENT BY TIME RATIO
Shinichiro Ogawa and Toshiyuki Matsuda, Tokyo, Japan, assignors to Honeywell Inc., Minneapolis, Minn., a corporation of Delaware
Filed Sept. 23, 1968, Ser. No. 761,623
Claims priority, application Japan, Sept. 22, 1967, 42/60,557
Int. Cl. H02j 7/00; H02m 7/00
U.S. Cl. 321—15                                 1 Claim

ABSTRACT OF THE DISCLOSURE

The movable contact of a change-over switch contacts with one and the other fixed contacts thereof to provide a time ratio. A differential electric charge detecting capacitor is charged only while the movable contact contacts with the one fixed contact to be charged in one direction. Means is provided to average the voltage across the electrode of the capacitor to obtain a DC voltage. A voltage-current converter converts the DC voltage into a direct current signal and forms a negative feedback circuit by connecting the capacitor through a load only while the movable contact contacts with the other fixed contact.

BACKGROUND OF THE INVENTION

This invention relates to a device to multiply an input current by a time ratio, and more particularly, this invention relates to an electric current operational device which converts an input current into an output current corresponding to the value obtained by multiplying the input current by a time ratio.

SUMMARY OF THE INVENTION

In the invention of subject application an output current $I_0$ obtained by multiplying an input current of, for instance, 4 ma. to 20 ma. DC by a time ratio $Ta/Tb$, consisting of an input direct current source, a change-over switch to provide a time ratio $Ta/Tb$ by the ON time during which the movable contact thereof is in contact with one and the other fixed contacts respectively, a differential electric charge detecting capacitor, a means obtaining a DC voltage by averaging the voltages across the electrodes of the capacitor, and a voltage-current converter converting the DC voltage into an output direct current and a load to receive the output direct current are provided.

The object of this invention is to provide a high accuracy current operational device by composing a simple circuit which requires only a small number of components and no special types of component.

Another object of this invention is, by means of composing such a circuit as obtains a DC voltage by averaging the voltages across the electrodes of a differential electric charge detecting capacitor and has a negative feedback circuit which will perform negative feedback to the differential electric charge detecting capacitor of the output current of the voltage-current converter which converts the DC voltage into an output direct current, to provide a current operational device of stable performance which is capable of ignoring the effects given to the conversion accuracy of the device by the performance variations in the various components brought about by the changes of the ambient temperature and humidity.

DESCRIPTION OF THE PREFERRED EMBODIMENT

Figure 1:
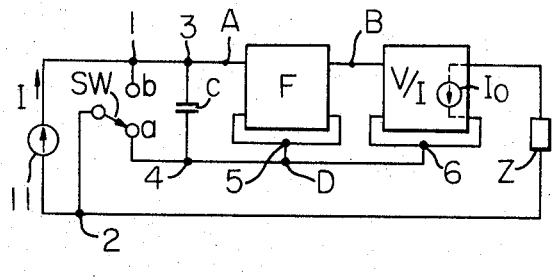
FIG. 1 is the connection diagram of an embodiment showing the basic construction of this invention.

In FIG. 1, C is a differential electric charge detecting capacitor, SW is a change-over switch, one of the fixed contacts $a$ and the other fixed contact $b$ of which are connected respectively to the two electrodes of the capacitor C and the movable contact of the switch is repeatedly switched so that it contacts one of the fixed contacts $a$ for time $Ta$ and the other fixed contact $b$ for time $Tb$, respectively.

F is means in which a pair of the input terminals are respectively connected to the two electrodes of the differential electric charge detecting capacitor and a DC voltage is generated across its pair of output terminals by averaging the voltages across the electrodes corresponding to the accumulated charges of the above differential electric charge detecting capacitor, and is exemplified, for instance, by a low-pass filter having a high input impedance.

V/I is a voltage-current converter which has its pair of input terimnals connected to the low-pass filter F and converts the DC voltage appearing across the output terminals of the low-pass filter F into an output direct current $I_0$ (a sign of current source is given to it, since it can be considered as a current source) corresponding to the amplitude of the voltage. One of the pair of the output terminals of the converter is connected to the movable contact of the change-over switch SW through a load Z and the other output terminal is connected to one of the fixed contacts $a$ of the change-over switch SW through joints 6, D and 4.

11 is an input current source which generates an input current I and a pair of its output terminals are respectively connected to the other fixed contact $b$ and the movable contact of the change-over switch SW.

Figure 3:
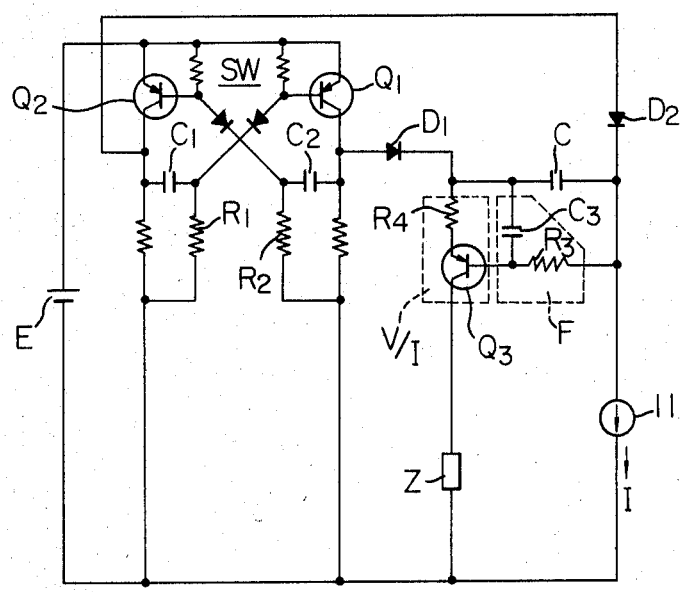
FIG. 3 is a diagram showing an embodiment of the device of this invention.

Further, to explain in more detail the relations between input current source 11, the voltage-current converter V/I, the load Z and the change-over switch SW, the following relationships exist: in case the positive output terminals of these two current sources are directly connected respectively to a pair of the fixed contacts of the change-over switch SW, one of their negative output terminals is connected directly to the movable contact of the change-over switch SW and the other negative output terminal is connected to the same movable contact through the load Z (see the circuit in FIG. 1); on the other hand, in case the negative output terminals of these two current sources are respectively connected to a pair of the fixed contacts of the change-over switch SW, one of their positive output terminals is connected directly to the movable contact of the change-over switch SW and the other positive output terminal is connected to the same contact through the load Z (see the circuit in FIG. 3).

In other words, the change-over switch SW is connected so that during the ON time $Ta$ while its movable contact is in contact with one of the fixed contacts, input current source 11 flows the input current I in one direction into the differential charge detecting capacitor C, whereas on the other hand, the movable contact and a pair of the fixed contacts of the change-over switch are connected to input current source 11, the differential electric charge detecting capacitor C and the voltage-current converter V/I so that a negative feedback circuit is formed to flow the output current $I_0$ of the voltage-current converter V/I in the reverse direction into said differential electric charge detecting capacitor C during the ON time T$b$ while, conversely, said movable contact is in contact with the other fixed contact.

FIG. 3 shows an embodiment of this invention where the low-pass filter F having a high input impedance is shown by a capacitor C$_3$ and a resistor R$_3$, the voltage-current converter V/I is shown by an emitter follower type transistor amplifier composed of a PNP transistor Q$_3$ and a resistor R$_4$ which is connected to its emitter, and the change-over switch SW is shown by an astable multivibrator which contains PNP transistors Q$_1$ and Q$_2$, capacitors C$_1$ and C$_2$, resistors R$_1$ and R$_2$ (the capacitors and resistors determine the time T$a$ and T$b$) and reverse flow preventive diodes D$_1$ and D$_2$; and a common DC power source E, the load Z, the differential electric charge detecting capacitor C and input current source 11 are shown by the same composition as that of the circuit in FIG. 1.

It is to be noted that in this case the polarity of input current source 11 and the voltage-current converter V/I relative to the change-over switch SW is different from that of the circuit in FIG. 1.

Figure 2:
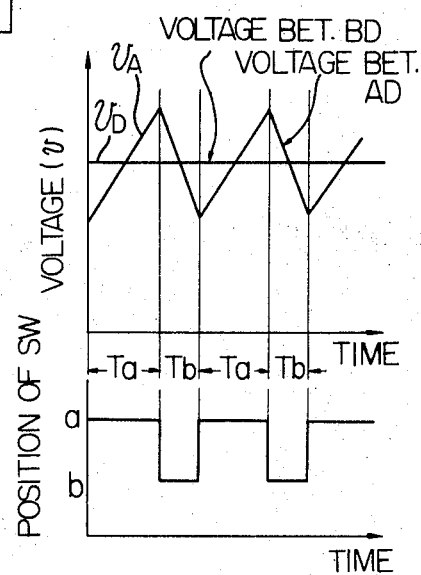
FIG. 2 is a diagram explaining the performance of the circuit in FIG. 1.

Next, the operation of the device of this invention having the composition described above will be explained in the following referring to FIG. 2.

As evident from the above description, the change-over switch SW can be exemplified, for instance, by an electronic switch as shown in the circuit of FIG. 3. Its movable contact is switched so as to contact one of the fixed contacts $a$ for T$a$ time and the other contact $b$ for T$b$ time respectively and this switching operation is repeated at a cycle of T$a$+T$b$.

During the ON time T$a$ while this change-over switch is contacting its movable contact to one of the fixed contacts $a$, the differential electric charge detecting capacitor C is charged in one direction by the input current I and accumulates a charge of the amount of IT$a$. Next, the movable contact of the switch SW changes to the other fixed contact $b$ in an instant and maintains the state of contact for T$b$ time; therefore, at this time the output current I$_0$ of the voltage-current converter flows in the reverse direction into the differential electric charge detecting capacitor C and accumulates a charge of I$_0$T$b$.

The low-pass filter of a high input impedance averages the voltages $v_A$ across the electrodes corresponding to the accumulated charges and generates a DC voltage $v_D$ across the output terminals BD; and the voltage-current converter V/I converts the DC voltage $v_D$ into an output direct current I$_0$ of the corresponding amplitude.

Consequently, during the time T$b$ while the movable contact of the change-over switch SW is in contact with the other fixed contact $b$ in the circuit of FIG. 1, a negative feedback circuit is formed where the output current I$_0$ flows into the differential electric charge detecting capacitor in the direction opposite to the input current I.

Thus, the differential electric charge detecting capacitor C accumulates a differential electric charge of the amount of $\Delta Q = IT_a - I_0 T_b$ in a cycle of T$a$+T$b$. Since a negative feedback circuit is composed as stated above, when the differential charge $\Delta Q > 0$, the mean DC voltage $v_D$ of the voltages $v_A$ across the electrodes of the capacitor C increases and the output current I$_0$ of the voltage-current converter V/I increases, and conversely when $\Delta Q < 0$, the output current I$_0$ decreases; and finally the circuit attains automatically the state of equilibrium of $\Delta Q = 0$ and maintains it.

Therefore, in the state of equilibrium, the relation of IT$a$=I$_0$T$b$ is maintained and the output current I$_0$ is represented by the input current I multiplied by the time ratio T$a$/T$b$ as shown by the formula below $$I_0 = \frac{Ta}{Tb} I$$

Thus, in the load Z flows the output current I$_0$ which is represented by $$\frac{Ta}{Tb} I$$

and obtained by multiplying the input current I by the given time ratio T$a$/T$b$.

We claim:
1. A device to multiply an input current by a time ratio T$a$/T$b$ comprising: a differential electric charge detecting capacitor; a change-over switch which has one and the other fixed contacts connected respectively to the two electrodes of said differential electric charge detecting capacitor and a movable contact which is switched so as to contact said one and the other fixed contacts for T$a$ and T$b$ time respectively; an input current source connected to said differential electric charge detecting capacitor only while the movable contact of said change-over switch is in contact with the one of said fixed contacts and charges said differential electric charge detecting capacitor in one direction by the input current; means for obtaining a DC voltage by averaging the voltages across said electrodes corresponding to the accumulated charges of said differential electric charge detecting capacitor; and a voltage-current converter which converts the DC voltage into a direct current signal of a proportionate amplitude and forms a negative feedback circuit by being connected to said differential electric charge detecting capacitor through a load only while the movable contact of said change-over switch is in contact with the other fixed contact.

References Cited
UNITED STATES PATENTS

| | | | |
|---|---|---|---|
| 2,449,077 | 9/1948 | Lindenblad | 321—49 XR |
| 2,781,490 | 2/1957 | Mitchell et al. | |
| 3,199,014 | 8/1965 | Putzrath | 320—1 |
| 3,371,232 | 2/1968 | Hannan et al. | 320—1 XR |
| 3,435,317 | 3/1969 | Osborn | 320—1 |

WILLIAM M. SHOOP, JR., Primary Examiner

U.S. Cl. X.R.

320—1